United States Patent [19]

Tovey

[11] 4,146,968

[45] Apr. 3, 1979

[54] INTERNAL DIAMETER GAUGE

[75] Inventor: John M. Tovey, Circle Pines, Minn.

[73] Assignee: National Can Corporation, Chicago, Ill.

[21] Appl. No.: 832,172

[22] Filed: Sep. 12, 1977

[51] Int. Cl.$^2$ .................................................. G01B 5/12
[52] U.S. Cl. .................................... 33/178 R; 33/147 F
[58] Field of Search ................. 33/147 F, 147 K, 162, 33/178 R, 178 F; 279/2 R, 111

[56] References Cited

U.S. PATENT DOCUMENTS

| | | | |
|---|---|---|---|
| 2,226,078 | 12/1940 | Spahn | 33/178 R |
| 2,566,970 | 9/1951 | Swensson | 33/147 F |
| 2,694,261 | 11/1954 | Dulligan | 33/178 R |
| 3,289,308 | 12/1966 | Tinka | 33/147 F |
| 3,995,374 | 12/1976 | Fisk | 33/147 F |

Primary Examiner—Richard R. Stearns
Attorney, Agent, or Firm—Robert A. Stenzel; Ralph R. Rath

[57] ABSTRACT

An internal diameter gauge for measuring thin wall containers is disclosed herein. The gauge includes a pair of mandrel halves that are supported between a shaft and a housing with cooperating camming surfaces on the mandrel halves, the housing and the shaft which move the peripheral semi-circular surfaces of the mandrel halves radially. The camming surfaces on the housing and shaft are biased toward each other through a biasing mechanism between the shaft and the housing while the mandrel halves are biased toward each other through a further biasing mechanism and a handle cooperates with the shaft to displace the shaft and allow the mandrel halves to contract.

12 Claims, 3 Drawing Figures

U.S. Patent   Apr. 3, 1979   4,146,968
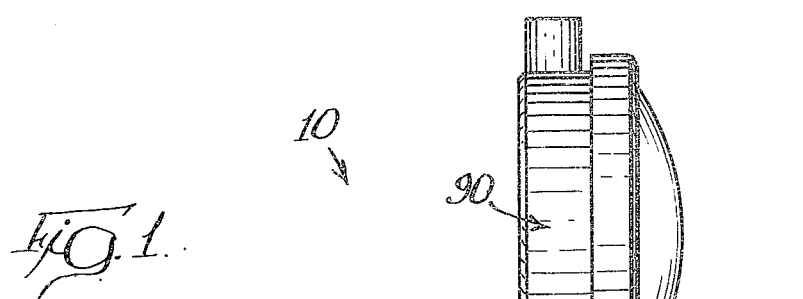
Fig. 1.
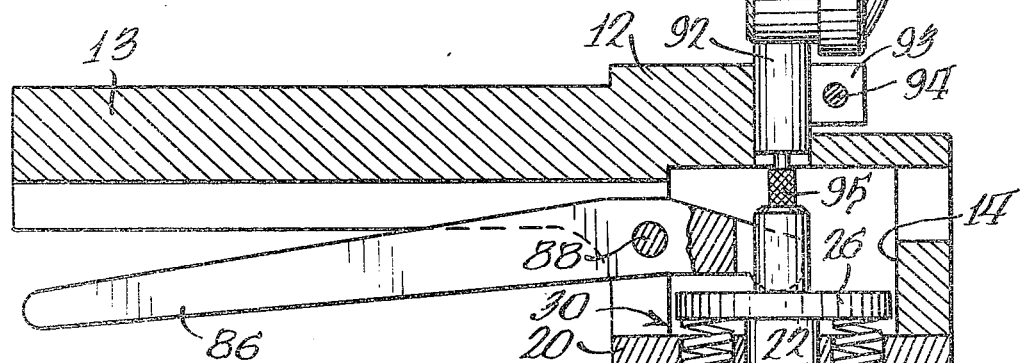
Fig. 2.
Fig. 3.
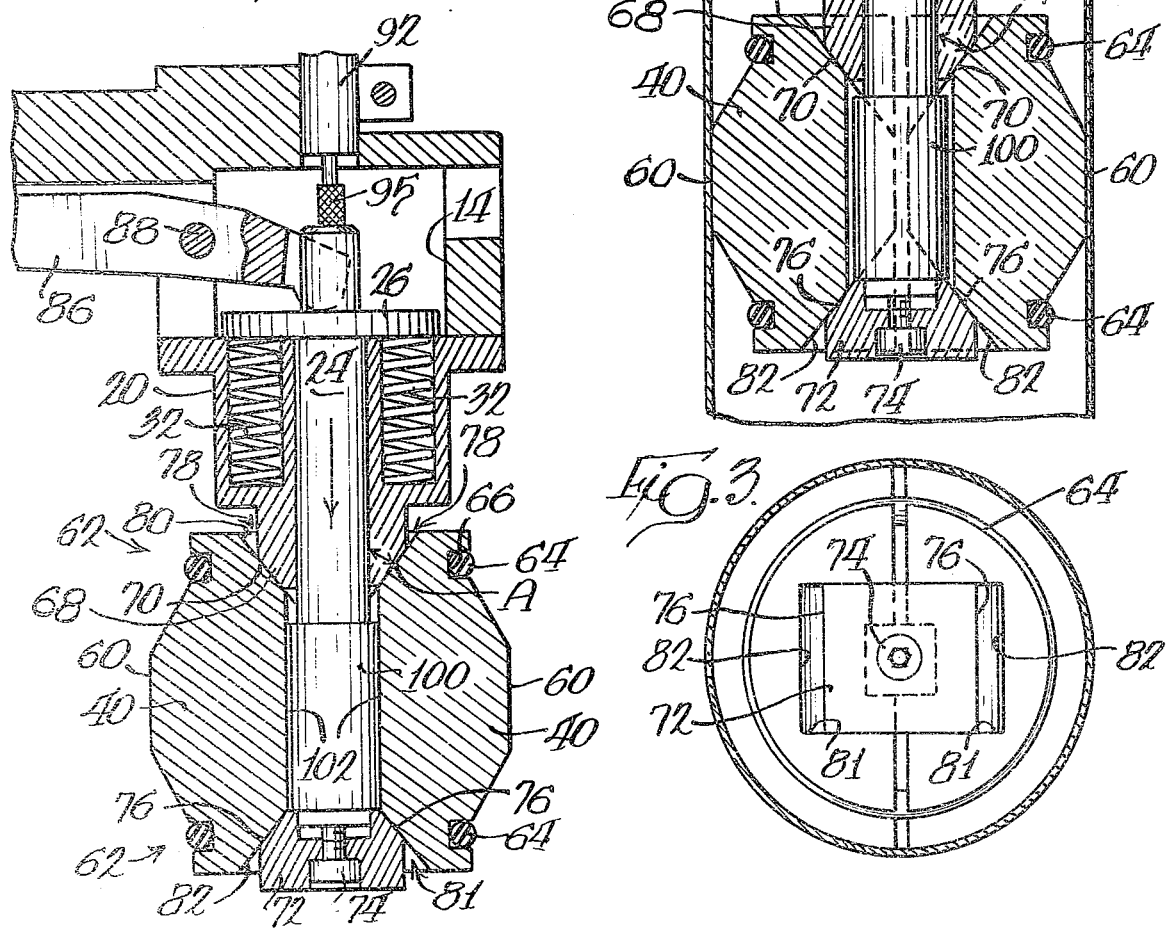

INTERNAL DIAMETER GAUGE

BACKGROUND OF THE INVENTION

The present invention relates generally to gauging devices and more particularly to a dial indicator gauge which may be utilized in accurately measuring the internal diameters of thin-walled containers.

While not limited to any particular field of use, the invention is particularly adapted for measuring the internal diameter of a drawn and ironed container.

Recent advances in the manufacture of drawn and ironed containers has resulted in having the technology developed to a point where a 12 ounce drawn and ironed container may be manufactured from a circular disc having a thickness on the order of 0.0135 inches. In manufacturing such a container, the ultimate thickness of the sidewall of the drawn and ironed container is on the order of 0.003 inches and is, therefore, very flexible. Thus, in many instances, the internal wall of the container is not truly circular after the drawing and ironing process has been completed. In view of the noncircularity of the internal diameter of the container, difficulties have been encountered in accurately measuring the diameter of the container to determine whether it meets with certain specifications.

One type of gauge that has been proposed for measuring containers of this type is disclosed in U.S. Pat. No. 3,289,308. This patent discloses a mechanism wherein the spring pressure of a spring unit interposed between a pair of plug elements is adjustable for varying the force exerted on the internal surface of a circular wall that is being measured. One of the difficulties with this type of gauge for accurately measuring the internal diameter of a drawn and ironed container is the fact that only the upper edge of the internal diameter can be measured. It will be appreciated that in the formation of a drawn and ironed container, the portion of the container sidewall which is adjacent the upper free edge is normally purposely made slightly thicker than the remainder of the container wall since this portion is utilized as a flange for seaming an end to the container after the contents have been inserted therein. Thus, the measurement of the upper edge of the drawn and ironed container is not a true reflection of the actual diameter of the remainder of the container. Furthermore, the complicated nature of the structure disclosed in this patent substantially increases the cost and it is believed that the accuracy of such a unit is limited.

SUMMARY OF THE INVENTION

The gauge of the present invention relies upon the flexibility of a thin-walled container and permits the internal diameter of the container to be measured within an accuracy of plus or minus 0.00005 inches when measuring conventional beer and beverage containers.

More specifically, the gauge of the present invention includes a housing having a first pair of camming surfaces adjacent an opening with a shaft reciprocated in the opening and having a second identical pair of opposed camming surfaces on the outer free end thereof. A pair of mandrel halves each have a semicircular peripheral surface which cooperate to define a circular surface that has a diameter slightly less than the internal diameter of the container to be measured and are urged towards each other at all times. The semicircular mandrel halves are positioned around the shaft and have cooperating camming surfaces on opposite ends thereof which engage the respective camming surfaces on the housing and the shaft. A biasing mechanism is interposed between the housing and the shaft to urge the mandrel halves away from each other while a handle cooperates with the shaft for manually overcoming the biasing mechanism. A further biasing mechanism urges the mandrel halves towards each other. Indicator means cooperate with the shaft to indicate the relative position of the mandrel halves with respect to each other.

With the arrangement described above, the opposite ends of the respective mandrel halves are moved radially with respect to the shaft by equal increments and, therefore, result in extended surface contact between the peripheral surface of the mandrel halves and the internal surface of the container to be measured.

The angle of the inclined camming surfaces on the respective members, with respect to the axis of the shaft is such that the axial movement of the shaft is a linear function of the internal diameter that is being measured. In the specific embodiment of the invention, this included angle between the camming surface and the axis of the shaft is less than 45 degrees and preferably is less than 40 degrees.

BRIEF DESCRIPTION OF THE SEVERAL VIEWS OF THE DRAWINGS

FIG. 1 is a cross-sectional view of the gauge of the present invention in its operative position within a container;

FIG. 2 is a view similar to FIG. 1 showing the gauge in a position for being inserted into a container being measured; and FIG. 3 is an end view of the gauge, as shown in FIG. 1.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

FIG. 1 of the drawings generally discloses a gauge 10 constructed in accordance with the teachings of the present invention. Gauge 10 consists of a housing or base 12 that has a gripping portion 13 extending therefrom and also has an opening 14 defined therein. A hub member 20 is secured to the lower end of base 12 by bolts (not shown) so as to form a part thereof. Hub member or fixed member 20 has a circular opening 22 defined therein which supports a movable member or shaft 24 for axial reciprocation therein. Shaft 24 has an enlarged disc 26 fixedly secured thereto and disc 26 is located within opening 14.

Biasing means 30 are interposed between base 12 and shaft 24 for biasing shaft 24 to a first position for a purpose that will be described later. In the illustrated embodiment, biasing means 30 consists of a plurality of small springs 32 respectively located in bores 34 which are defined in hub 20 at circumferentially spaced locations. While the number of springs will depend upon the exact spring bias that is necessary, four or six of such openings and springs could be positioned at equally spaced circumferential locations around the perimeter of opening 22 so that equal forces will be applied to the peripheral portion of enlarged disc 26 and, therefore, apply equal pressure between the shaft 24 and the base 12, particularly hub 20.

According to the present invention, two mandrel halves 40 surround the lower end of shaft 24 and each have a semicircular or arcuate peripheral surface segment 60. The two surface segments 60 on the respective mandrel halves cooperate to define a circumferential surface of a predetermined diameter, which is less than the diameter of the container to be measured. The mandrel halves 40 are urged towards each other through urging means 62 that respectively cooperate with opposite ends thereof. In the specific illustrated embodiment, each urging means 62 consists of an elastomeric ring 64, such as an O-ring, which is received into an annular recess 66 and recess 66 and O-ring 64 are spaced inwardly from peripheral surfaces 60.

According to the primary aspect of the present invention, cooperating means respectively on the base, the shaft, and the respective mandrel halves cooperate with each other to move opposite ends of the respective mandrel halves in equal increments with respect to each other as will now be described.

As illustrated in FIGS. 1 and 2, the lower end of hub 20 has an integral rectangular member 68 which has opposed inclined walls 70 that cooperate with the upper ends of the respective mandrel halves 40 to move the mandrel halves radially outward. In the illustrated embodiment the camming surfaces are flat inclined surfaces 70 which are diametrically opposed to each other, and each surface 70 defines a predetermined included angle A with respect to the axis of shaft 24. Likewise, the lower end of shaft 24 has an enlarged rectangular portion 72 removably secured thereto by a screw 74. Enlarged portion 72 again has flat opposed inclined surfaces or walls 76 that also each define an angle with respect to the axis of shaft 24 that is equal to angle A described above.

Each of the mandrel halves 40 has a recess 78 at the upper end thereof and recess 78 has a flat inclined surface 80 in engagement with a surface 70. Also the lower end of each mandrel has a recess 81 which has a flat inclined surface 82 in engagement with a surface 76. Surfaces 80 and 82 on the respective mandrel halves each define an angle with respect to the axis of shaft 24 which is equal to angle A described above. Thus, surfaces 80 are in extended contacting engagement with surfaces 70 on the upper end of mandrel halves 40 while surfaces 82 are in extended engagement with surfaces 76 adjacent the lower ends of mandrel halves 40. Since the angles of all of the inclined flat surfaces respectively on base 12, shaft 24 and mandrel halves 40 are equal, the opposite ends of mandrel halves 40 will move in equal increments in response to relative movement of shaft 24 with respect to base 12.

Also, the size of each recess is such that the upper pair of recesses 78 cooperate to define a rectangular opening that corresponds to the size of rectangular member 68 while the lower recesses 81 define a rectangular opening that corresponds to the size of rectangular member 72. With this arrangement, opposite ends of mandrel halves are guided for movement along a radial path with respect to the axis of shaft 24.

Before describing the operation of the present unit, the remainder of the structure will now be described. Base 12 has a moving means in the form of a handle 86 pivoted on a pin 88 and secured to the upper end of shaft 24. This securement may be in the form of a pin (not shown) or other suitable type of connection means.

Moving means 86 is capable of overcoming the force of biasing spring 30 to move shaft 24 axially in the direction illustrated by the arrow in FIG. 2.

A dial indicator 90 has a stem portion 92 fixedly secured to base 12 through a pair of ears 93 (only one being shown) and a bolt 9 extending between ears 93. A sensing plunger 95 extends through stem 92 and is biased into engagement with the upper end of shaft 24 through internal biasing mechanism (not shown) within dial indicator 90. Thus, the sensing plunger is moved axially as a direct linear function of movement of shaft 24 with respect to base 12 and indicates such movement on the dial of indicator 90. As indicated above, this movement is preferably a linear function of the internal diameter of the article to be measured.

Shaft 24 has an enlarged rectangular portion 100 intermediate opposite ends thereof while mandrel halves 40 each has a recess 102 which cooperate to define a rectangular opening that has a size equal to the size of enlarged rectangular portion 100 when the mandrel halves are in a closed position illustrated in FIG. 1. The rectangular portion 100 and recesses 102 further assure that the mandrel halves are moved radially with respect to shaft 24.

OPERATION

It is believed that the operation of the present gauge 10 is readily understood from the above description but will be briefly summarized at this point. Camming surfaces 70 and 76 respectively on base 12 and shaft 24 are normally biased towards each other by biasing means 30 which separate mandrel halves 40. The maximum spacing between mandrel halves may be set in any number of ways such as with suitable stop members defined between shaft 24 and base 12.

Before taking a measurement, the gauge is accurately set utilizing a master ring (not shown) which has a predetermined internal diameter. The mandrel halves are inserted into this ring and the handle 86 is released so that the peripheral surfaces 60 of mandrel halves 40 are in point contact with the internal surface of the master ring. The setting of the dial indicator 90 is then set at zero and the gauge is removed from the master ring.

When a container diameter is to be measured, the operator grips handle 86 and gripping portion 13 and moves shaft 24 in the direction indicated by the arrow in FIG. 2 which will move surfaces 70 and 76 away from each other. As surfaces 70 and 76 move away from each other, urging means 62 will force mandrel halves 40 towards each other until the adjacent surfaces of the inner edges engage each other so that mandrel halves 60 define a circumferential peripheral surface through surface segments 60. The can diameter gauge 10 is then positioned within the container as illustrated in FIG. 1 and handle 86 is released. When handle 86 is released, biasing means 30 urges shaft 24 in the direction illustrated by the arrow in FIG. 1 and the extended surface contact between surfaces 70, 80 and 76, 82 on opposite ends of mandrel halves 40 will overcome the force of elastomeric rings 64 and move opposite ends of mandrel halves 40 radially outwardly in equal increments until surfaces 60 are in extended surface contact with the internal diameter of the container. If the sidewall of the container to be measured is not truly circular, the force of biasing mechanism 30 will urge mandrel halves outwardly until the respective surfaces 60 are in extended surface contact with the internal surface of the container. Since the axial movement of shaft 24 is accurately measured by equal movement of sensing plunger 95, the relative position of the mandrel halves with respect to each other can be read directly from dial indicator 90.

EXAMPLE

While it will be appreciated that the various dimensions of a particular gauge may readily be varied, a specific example for a particular type of thin-walled container will be described for purposes of completeness. To measure a conventional 12 ounce 211 diameter container, which should have a mean diameter of 2.5955 inches, the dimensions are such that the peripheral diameter defined by surfaces 60, when the mandrel halves are completely closed, is 2.5800 inches.

The angle (A) of the camming surfaces is a function of the circumference to diameter ratio of the article to be measured. Thus, the angle A was selected such that the axial movement of the shaft was equal to twice the variation in internal diameter of a container to be measured. The exact angle A required for producing such two to one ratio is 38 degrees, 9 minutes and 24 seconds. With such a ratio, one increment of linear shaft displacement, e.g., 0.001 inches, will be equal to a radial displacement of the mandrel halves which corresponds to one increment, e.g. 0.001 inches, of diameter change of the container being measured.

Since the mandrel halves each have camming surfaces on both ends, the mandrel halves also move linearly with respect to the dial indicator. Therefore, the ratio of the linear movement of the shaft and mandrel halves is two to one, or a direct function of the diameter of the containers to be measured.

While a preferred embodiment of the invention has been illustrated and described, it is to be understood that minor modifications can be made without departing from the spirit of the invention. For example, while a biasing mechanism 30 has been shown for urging the mandrel halves apart, this could readily be accomplished by appropriate positioning of the handle 86 with respect to gripping portion 14 so that a manual force could be applied to move shaft 24 in opposite directions and move the mandrel halves with respect to each other. Also, the inclined surfaces cooperating with the mandrel halves could be conical surfaces and function in the same manner described above.

I claim:

1. A gauge for measuring the internal diameter of a cylindrical body comprising: a base having an opening therein; a shaft slidable in said opening and having a free end spaced from said base; an enlarged portion on the free end of said shaft, said enlarged portion having a peripheral surface defining a pair of diametrically opposed inclined portions inclined with respect to the axis of said shaft by a predetermined angle, said base having an opposed portion surrounding said shaft and being spaced from said free end, said opposed portion on said base having a pair of diametrically opposed inclined portions defining an angle with respect to the axis of said shaft which is equal to said predetermined angle; a plurality of annular segments circumferentially spaced around said shaft and located between said inclined portions, said plurality of annular segments each having an arcuate peripheral surface segment; said peripheral surface segments cooperating to define a continuous circumferential surface of a predetermined diameter, said annular segments having opposed flat inner surfaces on opposite ends thereof respectively engaging said inclined portions; means cooperating with said annular segments for urging said annular segments radially inwardly, and moving means operatively connected between said shaft and said base for axially shifting said shaft in said opening to move said annular segments radially with respect to the axis of said shaft, said moving means including biasing means biasing said enlarged portion and said opposed portion relative to each other in one direction and manually actuated means cooperating with said shaft for urging said enlarged and opposed portions relative to each other in the opposite direction.

2. A gauge as defined in claim 1, said predetermined angle is less than 40°.

3. A gauge as defined in claim 1, in which said plurality of annular segments includes two segments each having an arcuate peripheral surface segment of approximately 180°.

4. A gauge as defined in claim 3, in which said means cooperating with said annular segments includes resilient means surrounding said annular segments.

5. A gauge as defined in claim 4, in which said annular segments each have a pair of spaced circumferential grooves respectively located adjacent opposite ends of said segments and said resilient means includes a pair of elastomeric rings respectively received in the respective grooves.

6. A gauge as defined in claim 3, in which said enlarged portion and said opposed portion are rectangular in cross section and each annular segment has recesses on opposite ends, one receiving a part of said enlarged portion and the other receiving a part of said opposed portion, said recesses and portions cooperating to guide each of said annular segments along a path extending radially of said shaft.

7. A gauge as defined in claim 1, in which said shaft and opening are circular and said biasing means biases said enlarged and opposed portions towards each other and said manually actuated means is capable of overcoming said biasing means to move said enlarged and opposed portions away from each other.

8. A gauge as defined in claim 1, in which said predetermined angle is such that axial movement of said shaft is an integral multiple of the internal diameter.

9. An internal diameter gauge for measuring internal diameters of thin-walled objects comprising: a base having an elongated circular opening therein; a shaft axially movable in said opening, said base having a first member surrounding said shaft and having a rectangular cross section in a plane perpendicular to the axis of said shaft and a pair of opposed flat inclined walls each defining a predetermined included angle with respect to the axis of said shaft of substantially less than 90°; a second member on the free end of said shaft spaced from said first rectangular member and having a rectangular cross section in a plane perpendicular to the axis of said shaft, said second rectangular member having a pair of opposed inclined walls each being inclined with respect to the axis of said shaft by said predetermined included angle; a pair of semicircular opposed mandrel halves surrounding said shaft and each having recesses on opposite ends thereof with each recess having an inner wall in extended contacting engagement with an associated inclined wall, said mandrel halves respectively having semicircular peripheral surface which cooperate with each other to define a circumferential surface of predetermined diameter; urging means cooperating with said mandrel halves for urging said mandrel halves towards each other; biasing means between said base and said shaft biasing said rectangular members toward each other and forcing said mandrel halves away from each other; indicating means operatively connected between said base and said shaft for indicating the position of said rectangular members with respect to each other along the axis of said shaft; and manually actuated means cooperating with said shaft for moving said rectangular members away from each other so that said manually means can be actuated to allow said urging means to move said mandrel halves towards each other whereby the semicircular peripheral surfaces cooperate to define a diameter less than the internal diameter of said thin-walled objects and then released so that said biasing means urges said mandrel halves radially outward with respect to the axis of said shaft to urge said peripheral surfaces into engagement with the internal surface of said thin-walled object.

10. An internal diameter gauge as defined in claim 9, in which said predetermined angle is less than 40°.

11. A gauge for measuring the internal diameter of a thin-walled container comprising: a pair of mandrel halves each having a semicircular peripheral surface, said surfaces cooperating with each other to define a circular surface of a diameter slightly less than said internal diameter; urging means urging said halves into engagement with each other, a fixed member having a first camming surface engaging one end of each of said mandrel halves, a movable member having a second camming surface engaging an opposite end of each of said mandrel halves, each of said camming surfaces including a pair of opposed inclined surfaces, each inclined surface being inclined a predetermined included angle with respect to said axis so that the relative movement of said first and second camming surfaces with respect to each other is a function of the diameter defined by the mandrel halves and which is a direct multiple of the internal diameter of the container, means for moving said camming surfaces relative to each other to move opposite ends of said mandrel halves in equal increments in response to relative movement of said camming surfaces along an axis for said mandrel halves so that said mandrel halves are moved radially of said axis, biasing means between said fixed member and said movable member normally biasing the first and second camming surfaces toward each other to cause said mandrel halves to be separated, and indicator means indicating the relative position of said camming surfaces with respect to each other.

12. A gauge as defined in claim 11, further including manually actuated means operatively connected between said fixed and movable members for overcoming said biasing means and moving said first and second camming surfaces away from each other to allow said mandrel halves to move toward each other.

* * * * *